United States Patent
Li et al.

(10) Patent No.: US 9,723,197 B2
(45) Date of Patent: Aug. 1, 2017

(54) DEPTH ESTIMATION FROM IMAGE DEFOCUS USING MULTIPLE RESOLUTION GAUSSIAN DIFFERENCE

(71) Applicant: SONY CORPORATION, Tokyo (JP)

(72) Inventors: Pingshan Li, Sunnyvale, CA (US); Xue Tu, Fremont, CA (US)

(73) Assignee: SONY CORPORATION, Tokyo (JP)

(*) Notice: Subject to any disclaimer, the term of this patent is extended or adjusted under 35 U.S.C. 154(b) by 87 days.

(21) Appl. No.: 14/675,287

(22) Filed: Mar. 31, 2015

(65) Prior Publication Data
US 2016/0295098 A1 Oct. 6, 2016

(51) Int. Cl.
H04N 5/232 (2006.01)
G06T 7/00 (2017.01)
G06T 7/571 (2017.01)

(52) U.S. Cl.
CPC ......... *H04N 5/23212* (2013.01); *G06T 7/571* (2017.01); *G06T 2207/10016* (2013.01); *G06T 2207/20024* (2013.01)

(58) Field of Classification Search
CPC .............. H04N 5/23212; G06T 7/0069; G06T 2207/20024
See application file for complete search history.

(56) References Cited

U.S. PATENT DOCUMENTS

| 4,965,442 A | 10/1990 | Girod et al. |
| 7,440,637 B2 | 10/2008 | Schechner et al. |
| 2001/0013895 A1* | 8/2001 | Aizawa ............... H04N 5/23212 348/222.1 |
| 2007/0036427 A1* | 2/2007 | Nakamura ......... G02B 27/0075 382/154 |
| 2009/0092336 A1* | 4/2009 | Tsurumi ............... G06K 9/3216 382/294 |
| 2009/0268985 A1* | 10/2009 | Wong ..................... G06K 9/209 382/299 |
| 2010/0080482 A1* | 4/2010 | Wong ................. H04N 5/23212 382/255 |

(Continued)

FOREIGN PATENT DOCUMENTS

| EP | 2 645 334 A1 | 10/2013 |
| WO | 2014/008939 A1 | 1/2014 |

OTHER PUBLICATIONS

European Patent Office (EPO), International Search Report and Written Opinion, PCT International Application No. PCT/US2016/013804, issued Apr. 26, 2016, pp. 1-14, with claims searched, pp. 15-20.

(Continued)

Primary Examiner — Jason Flohre
(74) Attorney, Agent, or Firm — O'Banion & Ritchey LLP; John P. O'Banion

(57) ABSTRACT

A blur estimation method and apparatus which utilizes Gaussian differences at multiple resolutions, upon which iterative convolution is performed to match sharpness measures between two images. Blur differences are combined with an iteration number selected from multiple resolution levels based on comparing a sharpness ratio as the blur difference estimate. Blur difference estimate is then applied through a depth model to arrive at a depth estimate. Blur difference depth estimation can be utilized for controlling operation of focus control hardware in an imaging device.

20 Claims, 11 Drawing Sheets

(56) References Cited

U.S. PATENT DOCUMENTS

| | | | |
|---|---|---|---|
| 2011/0142287 A1* | 6/2011 | Wong | G06T 7/0069 |
| | | | 382/106 |
| 2011/0150447 A1* | 6/2011 | Li | H04N 5/23212 |
| | | | 396/104 |
| 2012/0249833 A1 | 10/2012 | Li | |
| 2013/0034297 A1 | 2/2013 | Papp et al. | |
| 2013/0142386 A1 | 6/2013 | Li et al. | |
| 2013/0182152 A1* | 7/2013 | Li | H04N 5/23212 |
| | | | 348/241 |

OTHER PUBLICATIONS

Fujiwara, H., "Passive Range Sensor Using Multi-Focus Images", Intelligent Robots and Systems '96, IROS 96, Proceedings of the 1996 L EEE/RSJ International Conference on Osaka, Japan, Nov. 4-8, 1996, New Yoirk, NY, USA, IEE, US, vol. 1, Nov. 4, 1996 (Nov. 4, 1996), pp. 104-111, XP010212367, DOI: 10.1109/IROS.1996.570638, IBSN: 978-0-803-3213-3.

* cited by examiner

DEPTH ESTIMATION FROM IMAGE DEFOCUS USING MULTIPLE RESOLUTION GAUSSIAN DIFFERENCE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This disclosure pertains generally to estimating focal distance, and more particularly to estimating focal distance in response to performing image defocusing.

2. Background Discussion

Blur matching is often utilized for estimating focal depth between two images. As the subject comes into focus, the captured image becomes the sharpest with its highest contrast (sharpest). Generally, when two pictures are taken at two different focus distances, the one captured closer to the subject distance is sharper than the other. The focus distances at which the pictures are taken and the amount of blur difference between these pictures can be utilized for estimating actual subject distance, or depth according to a focus model determined for that camera-lens system, such as by utilizing a step-edge image at different focal lengths.

Blur matching can be performed either with direct matching or indirect matching. The use of direct matching relies upon comparing pixel correspondence between the two images and makes a comparison of pixels in corresponding positions in the images being processed. In view of these direct pixel to pixel comparisons, direct matching is thus subject to significant issues when relative motion arises between the two images, and these issues become especially problematic in the case where rotational motion or shape changing arises between the two images. Indirect matching performs a comparison after some processing of the images, so that a direct comparison is not being made. However, attempts at using indirect matching have themselves failed to provide optimum results.

Accordingly, a need exists for an indirect blur matching apparatus and method which overcomes shortcomings of previous direct and indirect blur matching methods.

BRIEF SUMMARY

An indirect blur matching apparatus and method are disclosed which improves performance in relation to indirect blur matching techniques that rely on the use of transforms, such as wavelet transforms. Rather than relying on the use of a transform, such as a wavelet transform, prior to comparing the subject images, a multiple resolution (multi-resolution) Gaussian difference is utilized and compared based on a sharpness (s) measure when indirectly comparing the blur difference of the two images. This blur matching is preferably utilized in combination with a focus mechanism on the camera for properly adjusting camera focus during automatic focus control.

Further aspects of the disclosure will be brought out in the following portions of the specification, wherein the detailed description is for the purpose of fully disclosing preferred embodiments of the disclosure without placing limitations thereon.

BRIEF DESCRIPTION OF THE SEVERAL VIEWS OF THE DRAWING(S)

The disclosure will be more fully understood by reference to the following drawings which are for illustrative purposes only:

DETAILED DESCRIPTION

Estimating focus depth based on blur differences between two images at two different focus positions is a known process described in a number of Sony patents and patent applications. In summary, the process involves capturing images for at least two different focus positions, and estimating blur in response to iterative convolution between images.

Consider the case where two pictures $f_A$ and $f_B$ are taken at positions A and B, with $f_A$ being sharper than $f_B$. The blur change can be modeled by a point spread function (PSF) P from position A to B as $$f_A * P = f_B$$

where * denotes the operation of two dimensional convolution. Furthermore, the point spread function P can be approximated by using a series of convolutions by a blur kernel K:

$$P = K * K * \ldots * K. \qquad (1)$$

By way of example kernel K may be chosen as:

$$K = \begin{bmatrix} \frac{1}{48} & \frac{1}{12} & \frac{1}{48} \\ \frac{1}{12} & \frac{7}{12} & \frac{1}{12} \\ \frac{1}{48} & \frac{1}{12} & \frac{1}{48} \end{bmatrix} \qquad (2)$$

whereby the amount of blur difference between $f_A$ and $f_B$ can be measured by the number of convolutions in Eq. (1). In actual implementation, the blur difference is preferably obtained by an iterative process:

$$I_{A\_B} = \underset{l}{\mathrm{argmin}} \| f_A * \underbrace{K * K * \ldots * K}_{l \text{ convolutions}} - f_B \| \qquad (3)$$

where $\|\cdot\|$ denotes a norm operator that evaluates the blur matching error between $f_A$ and $f_B$. It will be appreciated, however, that the above equation describes the process as performed in "direct matching" of blur differences.

A matching curve can be utilized in the process of comparing blur differences, and provides a relationship between the iteration number and the lens focusing position. In order to obtain the matching curve for a given depth, a sequence of pictures is taken for the whole focus range of the lens, after which the blur difference is calculated between every two consecutive pictures. The first picture of the sequence is taken at the focus distance of infinity, then one picture is taken every time the lens is moved to focus at one depth of field closer, until the lens reaches minimal focus distance. This sequence of pictures is denoted by $f_0$, $f_1, \ldots, f_{N-1}$, where N is the length of the sequence. The sign of an iteration number on a matching curve indicates which image of the two is sharper. If $f_i$ is sharper than $f_{i+1}$, the sign is positive; otherwise the sign is negative.

Estimating depth based on blur matching is performed in response to matching curve characteristics. It will be appreciated that the characteristics can be modeled by linear slopes, polynomials, and so forth. During the autofocus process, pictures are taken at different focus positions. The blur difference between each two pictures is calculated, and the matching curve model utilized to estimate the depth.

Figure 1:
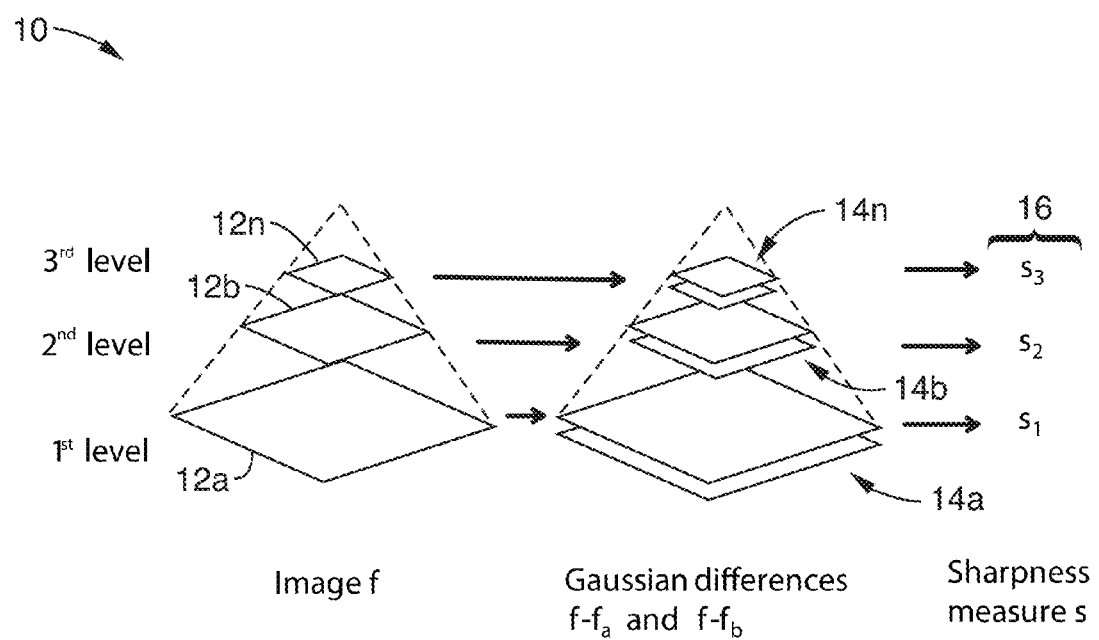
FIG. 1 is a block diagram of determining multi-resolution Gaussian differences from which to determine blur difference according to an embodiment of the disclosed technology.

FIG. 1 illustrates an example embodiment 10 of performing indirect matching using Gaussian differences. An image f is seen at multiple levels of resolution 12a, 12b through to 12n. By way of example and not limitation, the example utilizes three levels of resolution. Gaussian differences are then generated 14a, 14b, 14n for each resolution level and sharpness measure determined 16 for each resolution level. The figure depicts this processing for a single image, the same process being performed for a second image, after which comparisons are made to determine which image is the sharpest.

Let $G(\mu, \sigma^2)$ denote Gaussian function with mean, $\mu$ and variance, $\sigma^2$. The following illustrates an example of sharpness measure using Gaussian differences:

$$f = h * G(0, \sigma^2)$$

in which f is the defocused blur image, h is the sharp image to which a Gaussian point spread function (PSF) $G(0, \sigma^2)$ is applied by convolution "*". The image is reblurred using $\sigma_a$ and $\sigma_b$ as follows:

$$f_a = h * G(0, \sigma_a^2) = h * G(0, \sigma^2 + \sigma_a^2)$$

$$f_b = h * G(0, \sigma_b^2) = h * G(0, \sigma^2 + \sigma_b^2)$$

in which $\sigma_b > \sigma_a$. It will be noted that $G(0, \sigma_a^2)$ and $G(0, \sigma_b^2)$ are Gaussian blur kernels with variances $\sigma_a^2$ and $\sigma_b^2$, respectively. By way of example and not limitation $\sigma_a^2 = 160$, $\sigma_b^2 = 240$ are used to generate the results in this disclosure, with multiple levels of resolution described in a later section.

The image is blurred by the difference of Gaussian as given by:

$$f - f_a = h \otimes (G(0, \sigma^2) - G(0, \sigma^2 + \sigma_a^2))$$

$$f - f_b = h \otimes (G(0, \sigma^2) - G(0, \sigma^2 + \sigma_b^2))$$

so that sharpness measure s(f) is given as:

$$s(f) = \frac{\| f - f_a \|}{\| f - f_b \|}.$$

The above process is performed for each of two images $f_A$ and $f_B$ with respective sharpness measures $s(f_A)$ and $s(f_B)$. The image with a smaller value of sharpness measure is the sharper image. For example, if $s(f_A) < s(f_B)$ then ($f_A$ is sharper), and indirect matching is then performed using iterative convolution to match the sharpness, $$I_{A\_B} = \underset{l}{\mathrm{argmin}} \left| s\left( f_A * \underbrace{K * K * \ldots * K}_{l \text{ convolutions}} \right) - s(f_B) \right|$$

in which K is a blur kernel with a small variance.

Accordingly, it is seen that iteration number $I_{A\_B}$ represents the blur difference between the two images (such as seen in Eq. (3)). For direct matching, the blur difference is calculated for the two images by comparing pixel values at corresponding locations of the two images. For indirect matching, the sharpness measure is compared between the two images.

The multiple resolutions of the Gaussian differences preferably comprise at least three different image resolutions. In at least one embodiment, the first resolution level is one-fourth of full resolution ($\frac{1}{4}^{th}$ of full resolution), with the second level being one-half of the resolution in each dimension of the first level ($\frac{1}{8}^{th}$ of full resolution), and the third being even a lower resolution at one-half of the resolution in each dimension of the second level ($\frac{1}{16}^{th}$ of full resolution). By way of example and not limitation, the original resolution is 6048×4024, with 95 images being captured from closest focus distance to 'infinity'. For each image resolution, blur difference $I_{A\_B}$ is calculated using indirect matching.

Different blur kernels are utilized at each of these different resolution levels as seen below.

$$\begin{bmatrix} \frac{1}{48} & \frac{1}{12} & \frac{1}{48} \\ \frac{1}{12} & \frac{7}{12} & \frac{1}{12} \\ \frac{1}{48} & \frac{1}{12} & \frac{1}{48} \end{bmatrix} 1^{st} \text{ level with } \sigma^2 = \frac{1}{4}$$

$$\begin{bmatrix} \frac{1}{1024} & \frac{15}{512} & \frac{1}{1024} \\ \frac{15}{512} & \frac{225}{256} & \frac{15}{512} \\ \frac{1}{1024} & \frac{15}{512} & \frac{1}{1024} \end{bmatrix} 2^{nd} \text{ level with } \sigma^2 = 1/16$$

$$\begin{bmatrix} \frac{1}{16384} & \frac{63}{8192} & \frac{1}{16384} \\ \frac{63}{8192} & \frac{3969}{4096} & \frac{63}{8192} \\ \frac{1}{16384} & \frac{63}{8192} & \frac{1}{16384} \end{bmatrix} 3^{rd} \text{ level with } \sigma^2 = 1/64$$

Thus, as the image shrinks by half in each dimension (¼ less resolution), then the variance of the blur kernel is reduced by four times (¼) so that the slope of the matching curve remains the same.

Figure 2A:
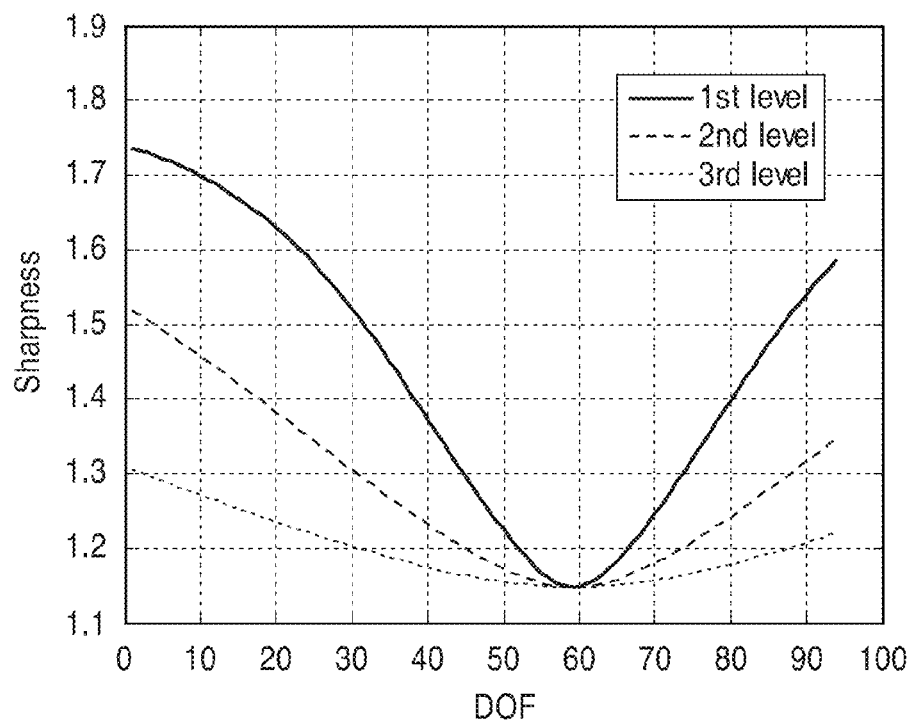
FIG. 2A and FIG. 2B are plots of sharpness and blur matching for $1^{st}$, $2^{nd}$, and $3^{rd}$ levels of resolution for a step edge example image sequence according to the present disclosure.

FIG. 2A depicts a sharpness measure for multi-resolution iterative convolution for a step edge image, showing sharpness with respect to depth of focus (DOF), for $1^{st}$, $2^{nd}$, and $3^{rd}$ levels of resolution.

Figure 2B:
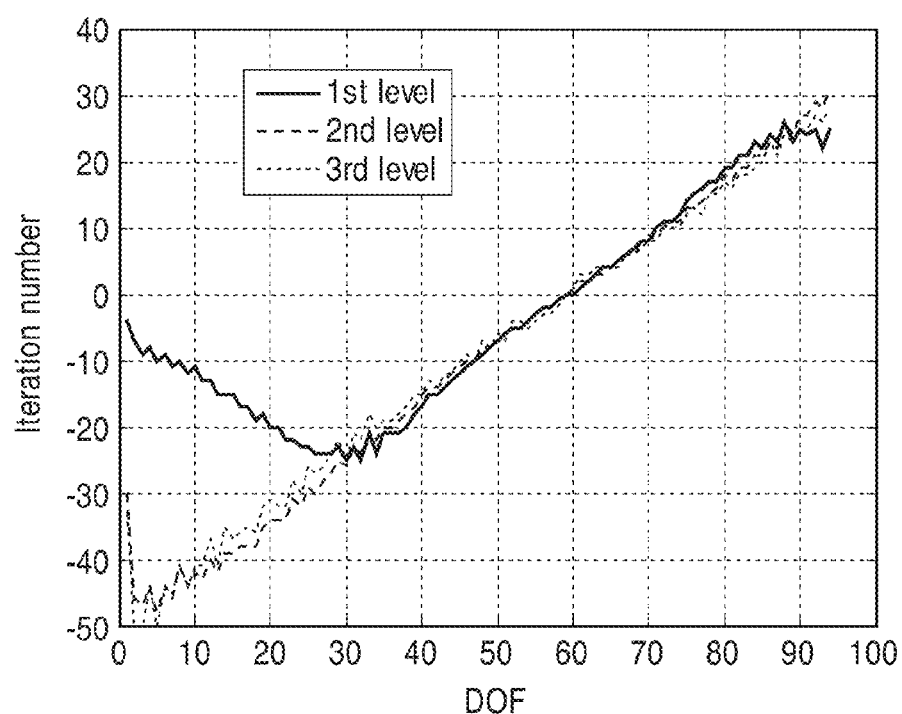

FIG. 2B depicts blur matching results for the $1^{st}$, $2^{nd}$, and $3^{rd}$ levels of resolution with respect to DOF. It can be seen that the first level ($1^{st}$ level) of resolution does not begin to properly match until numerous iterations have been performed.

It should be appreciated that the lower levels (e.g., larger image resolutions) provide better blur matching for near in-focus positions, while higher levels (smaller image resolutions) provide improved blur matching for big blur situations. The term "big blur" means that the focal position is far away from the in-focus position, thus the amount of blur is large and the image will appear very blurry because of defocus. It will be appreciated that the $1^{st}$ level is the lowest numbered level and has the highest resolution, while the $3^{rd}$ level is the highest numbered level of these multiple resolution levels and has the lowest resolution. When the level number increases, image resolution decreases.

It will be noted for the measure in FIG. 2A, that when the slope of the curve is steeper, the results are "better", such as for $1^{st}$ level, where the curve is steeper around in-focus position (DOF 58), but becomes flatter when the DOF number is less than 10 ("big blur"). The opposite is true for the $3^{rd}$ level. For FIG. 2B, a better curve means it is more linear and less noisy (less fluctuation). In this example, level 2 and 3 have about the same performance.

Considering the step edge results seen in FIG. 2A and FIG. 2B, it will be noted that the matching result for the $1^{st}$ level does not provide suitable results for big blur, while the $2^{nd}$ and the $3^{rd}$ levels operate suitably. It should be appreciated that results for other images may demonstrate different behavior of the sharpness measures and iterative convolution results. The present disclosure is thus not limited to taking one level over another, as the object of this technology is configured to choose one (or more) best iterative convolution results from different resolution levels.

The following considers the sharpness measure. Assume values $s_1$, $s_2$, $s_3$ are sharpness measure values at $1^{st}$, $2^{nd}$, and $3^{rd}$ levels, respectively. The ratios $s_3/s_2$, and $s_2/s_1$ can be used according to the presented disclosure for determining which iteration number to choose. Larger ratio values means this image is close to the in-focus position and the system is configured to choose iteration number from lower levels; otherwise the system chooses an iteration number from the higher levels.

The following describes how the system selects an iteration number from multi-resolutions. Let $i_1$, $i_2$, $i_3$ be the iteration number for $1^{st}$, $2^{nd}$, and $3^{rd}$ levels, respectively. The final iteration number is chosen based on sharpness ratios in relation to a threshold value t. According to at least one embodiment, these ratios are expressed as follows.

if $s_3/s_2 > t$ and $s_2/s_1 > t$; then select iteration number $i_1$.

else if $s_3/s_2 > t$; then select iteration number from $\{i_1, i_2\}$ that has the largest absolute value.

else if $s_2/s_1 > t$; then select the iteration number from $\{i_1, i_3\}$ that has the largest absolute value.

otherwise choose the iteration number from $\{i_1, i_2, i_3\}$ that has the largest absolute value.

By way of example and not limitation, the threshold value, t which was utilized in these tests was t=1.1.

Figure 3:
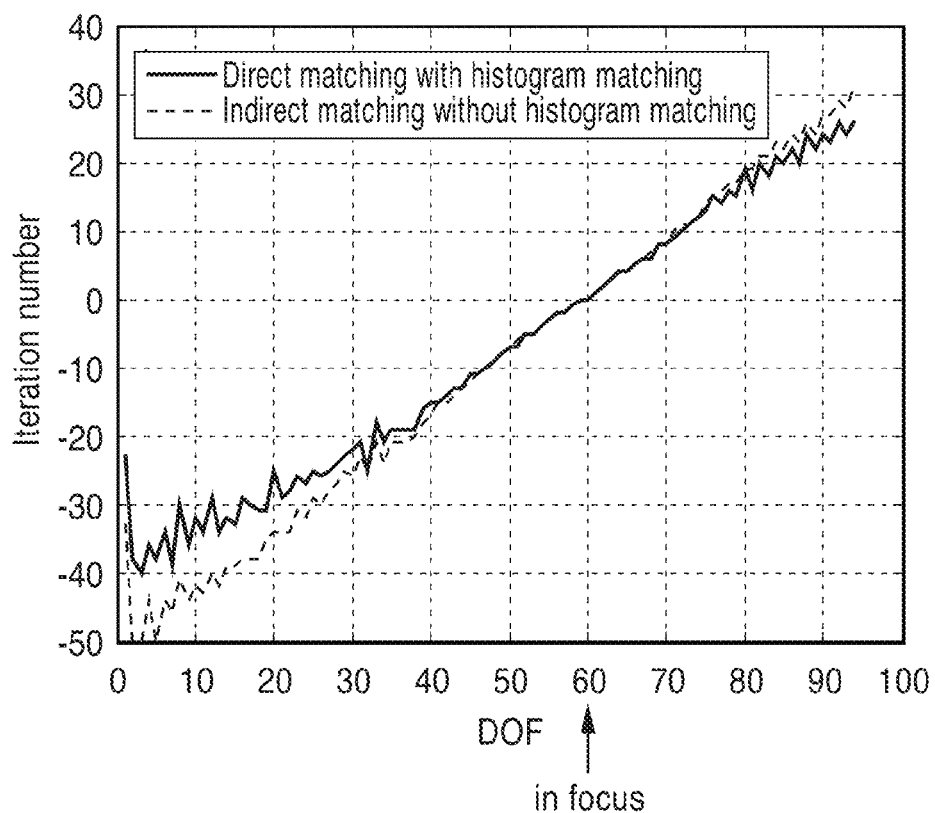
FIG. 3 is a plot of iteration number with respect to depth of field (DOF) for a step edge image sequence comparing direct matching with indirect matching according to the present disclosure.

FIG. 3 depicts the result of the above procedure applied to the data in FIG. 2. It will be noted that direct matching utilizes histogram matching, and indirect matching does not utilize histogram matching. It should be appreciated that histogram matching is used in the direct matching approach toward improving matching performance for static scenes. Direct matching without the use of histogram matching yields worse results compared to direct matching with histogram matching. This figure illustrates that for indirect matching, histogram matching is not necessary, with results that are improved over direct matching. It will be seen from the figure that indirect matching results are more linear than direct matching. Smaller image resolution (higher level) helps improve the performance in big blur situation. No histogram matching is needed for indirect matching and it is more robust to brightness change.

Figure 4:
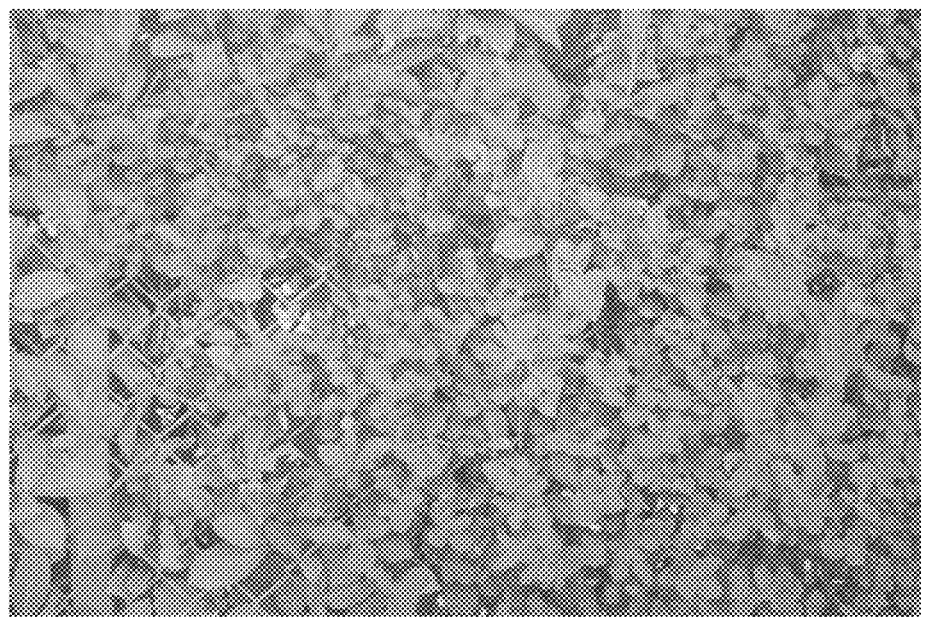
FIG. 4 is an example image "chain-link fence".

FIG. 4 depicts an example image of a complex natural image showing a chain-link fence interlaced with foliage, referred to herein as the "fence image".

Figure 5A:
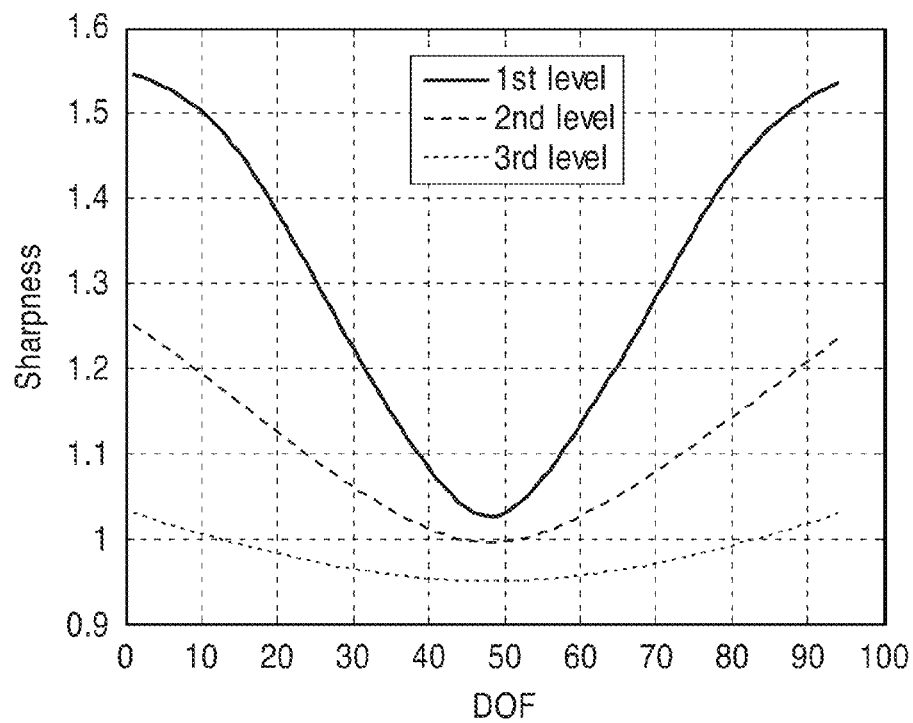
FIG. 5A and FIG. 5B are plots of sharpness and blur matching for $1^{st}$, $2^{nd}$, and $3^{rd}$ levels of resolution for the "chain-link fence" image according to the present disclosure.
Figure 5B:
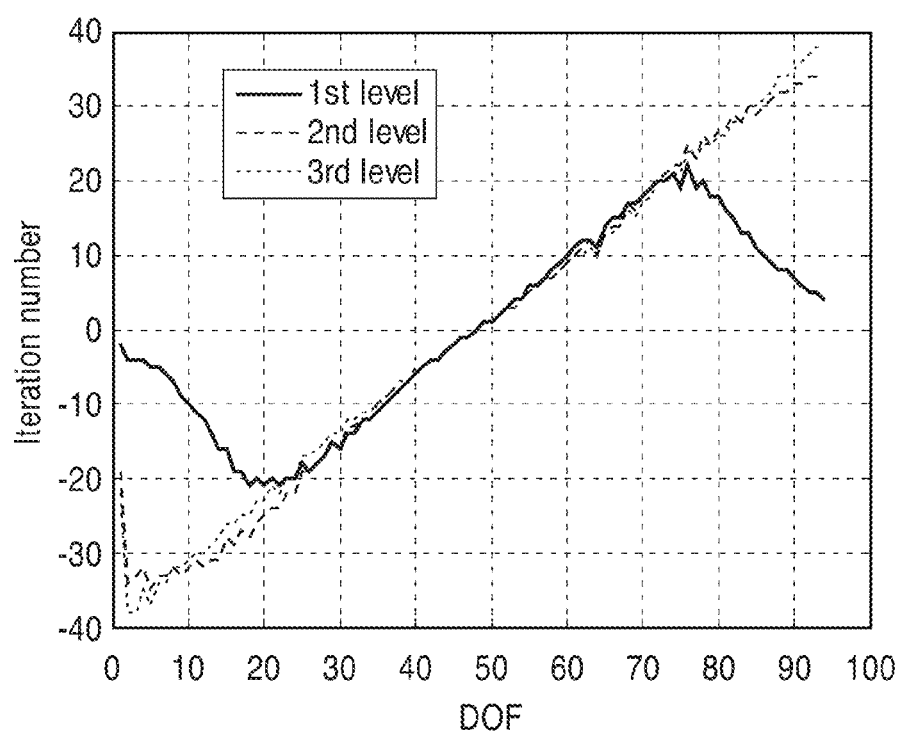

FIG. 5A and FIG. 5B depict a sharpness measure and blur matching results for the fence image. These are the same type of plots as were discussed in FIG. 2A and FIG. 2B.

Figure 6:
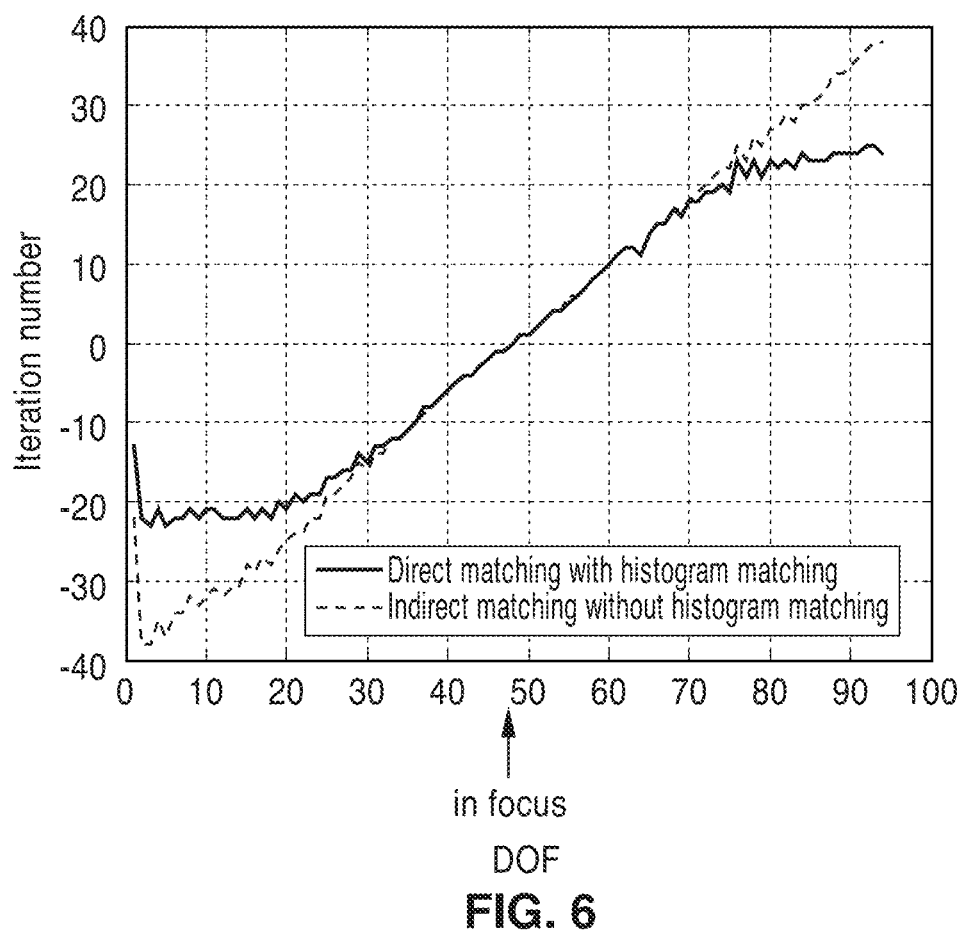
FIG. 6 is a plot of iteration number with respect to depth of field (DOF) for the "chain-link fence" image according to the present disclosure.

FIG. 6 depicts iteration numbers for the fence image in relation to DOF, for both direct and indirect matching. For a natural image, it has been found for the disclosed technology that indirect matching renders improved performance over direct matching.

Figure 7A:
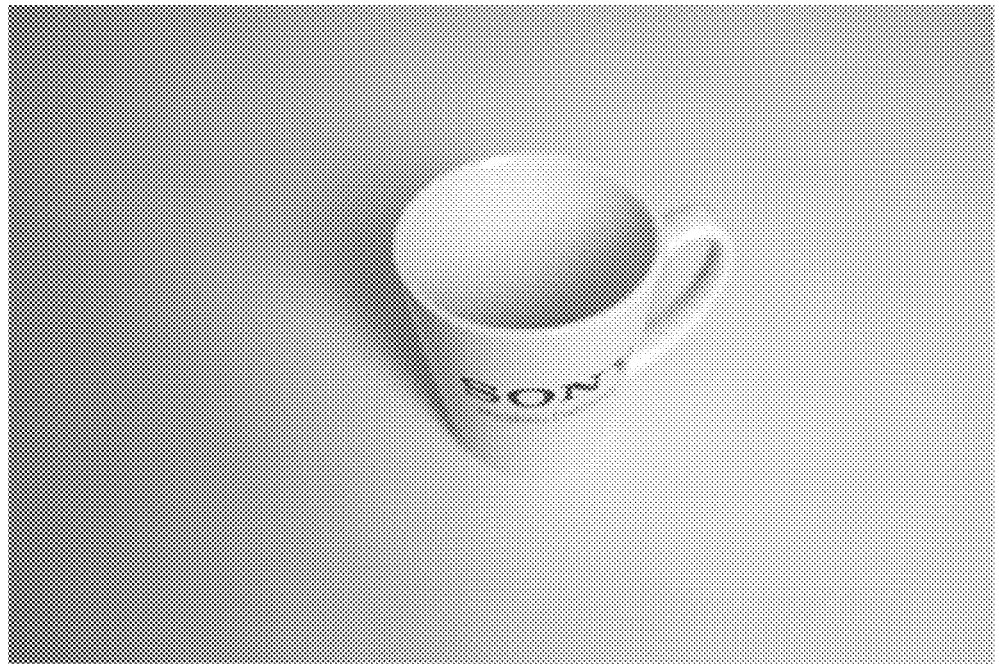
FIG. 7A and FIG. 7B are example images "coffee-mug".
Figure 7B:
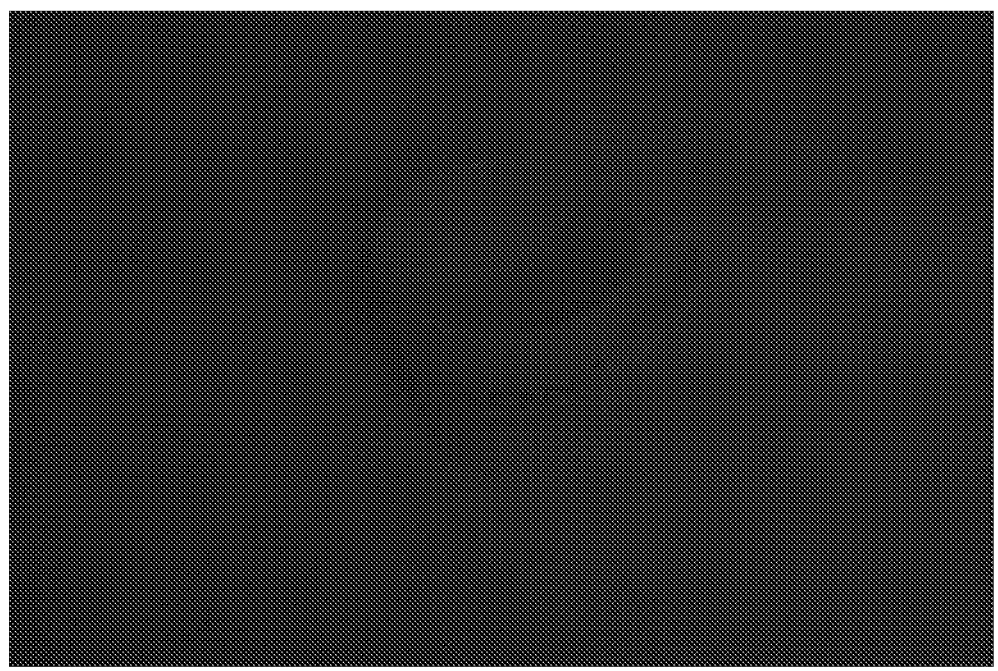

FIG. 7A and FIG. 7B depict an example set of images of a white coffee-mug on a white surface, with the image captured at 1/10 second exposure in FIG. 7A, and at a 1/800 second exposure in FIG. 7B.

Figure 8A:
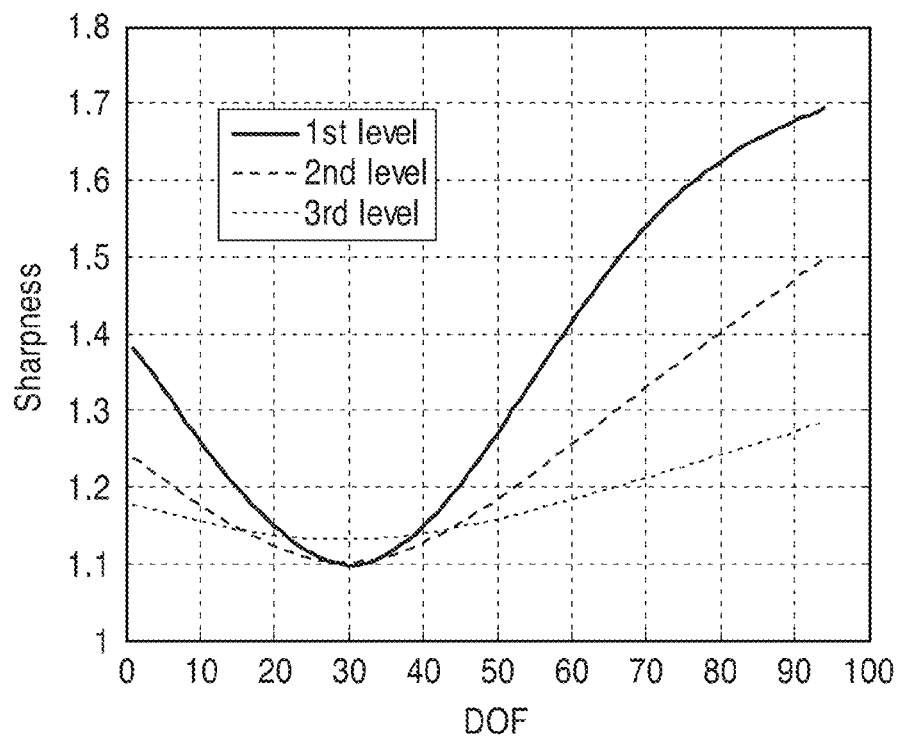
FIG. 8A and FIG. 8B are plots of sharpness and blur matching for $1^{st}$, $2^{nd}$, and $3^{rd}$ levels of resolution for the "coffee-mug" images according to the present disclosure.
Figure 8B:
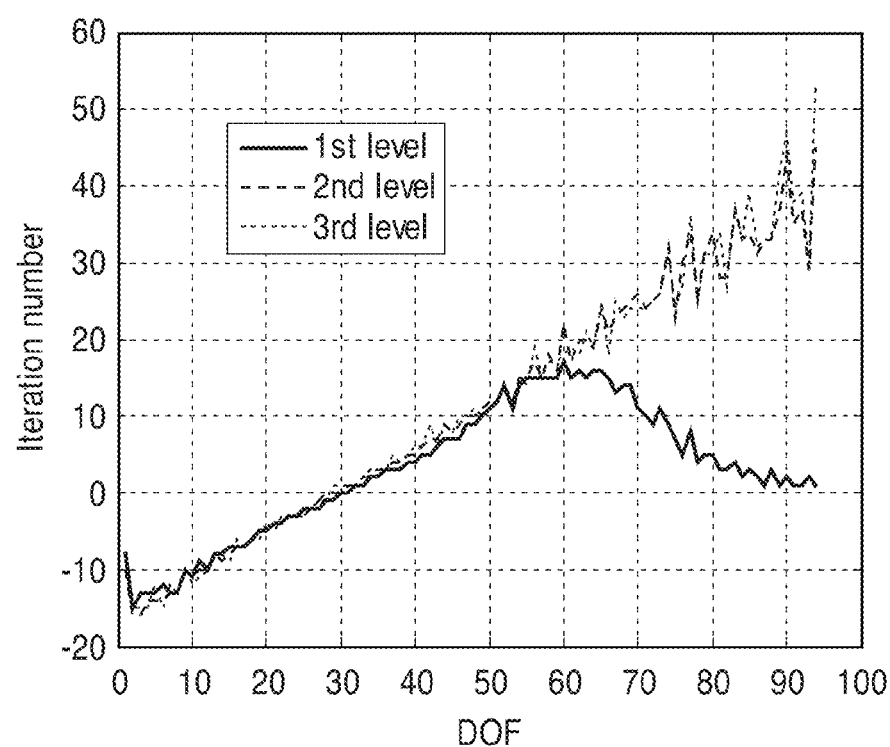

FIG. 8A and FIG. 8B depict a sharpness measure and blur matching results for the coffee-mug image in FIG. 7B. These are the same type of plots discussed in FIG. 2A and FIG. 2B.

Figure 9:
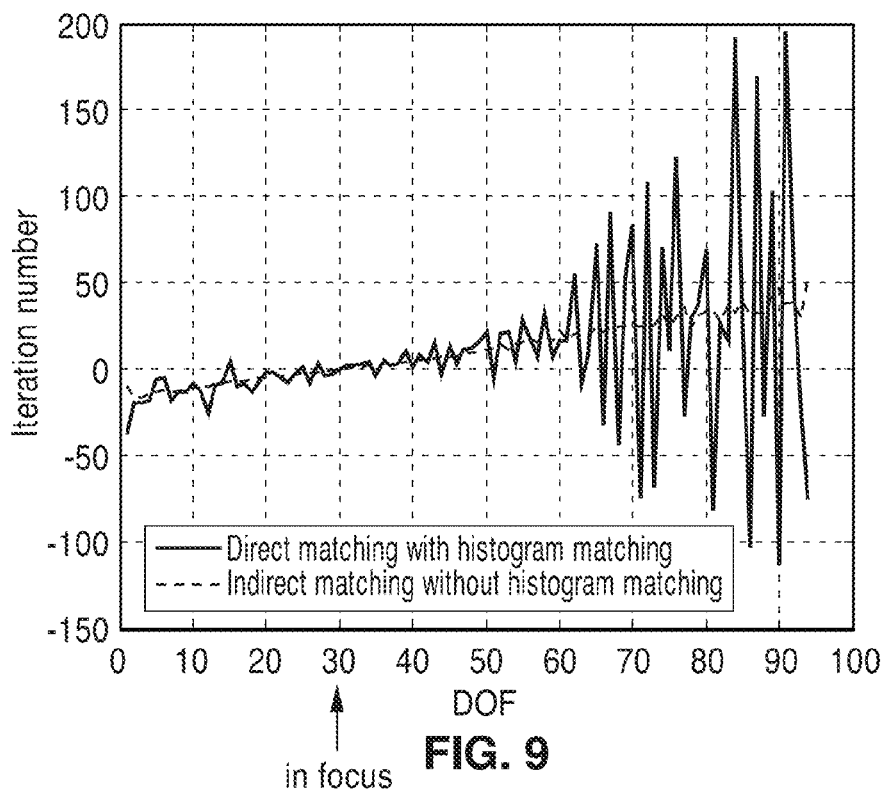
FIG. 9 is a plot of iteration number with respect to depth of field (DOF) for the "coffee-mug" images according to the present disclosure.

FIG. 9 depicts iteration numbers for the coffee-mug image in relation to DOF, for both direct and indirect matching. It will be seen that direct matching breaks down when subject to significant blurring, while the indirect matching is still workable.

Figure 10:
FIG. 10 is an example image from a timed sequence "blowing tree".

FIG. 10 depicts an example image of a tree blowing in the wind, referred to as the "blowing tree image" herein, as part of a test on local motion comprising a series of images captured at the rate of 10 seconds per image. In view of the time delay between images, there is no close similarity between two consecutive images.

Figure 11A:
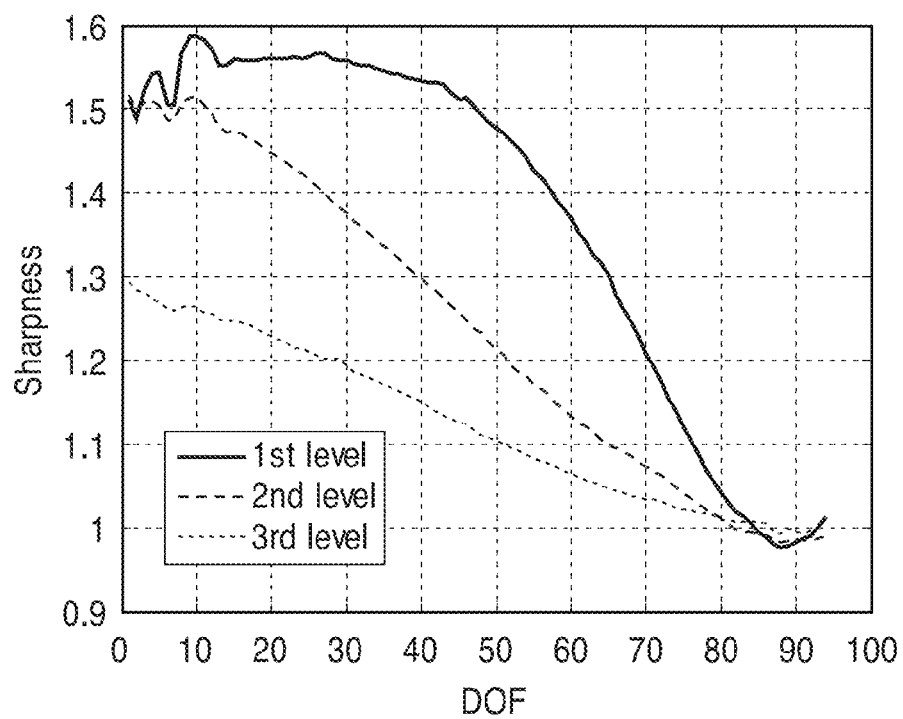
FIG. 11A and FIG. 11B are plots of sharpness and blur matching for $1^{st}$, $2^{nd}$, and $3^{rd}$ levels of resolution for the "blowing tree" image sequence according to the present disclosure.
Figure 11B:
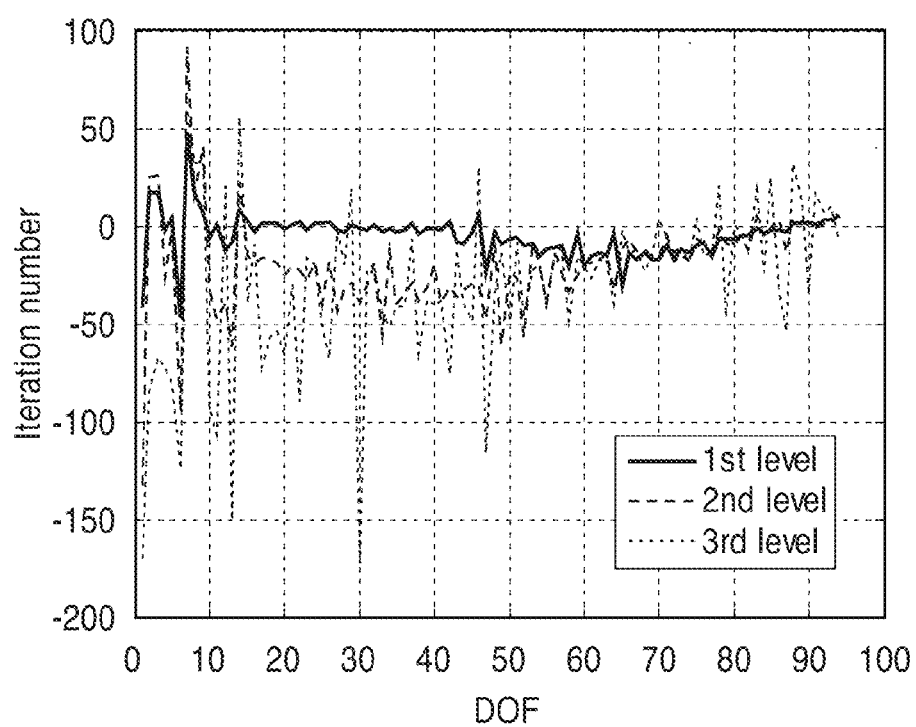
Figure 12:
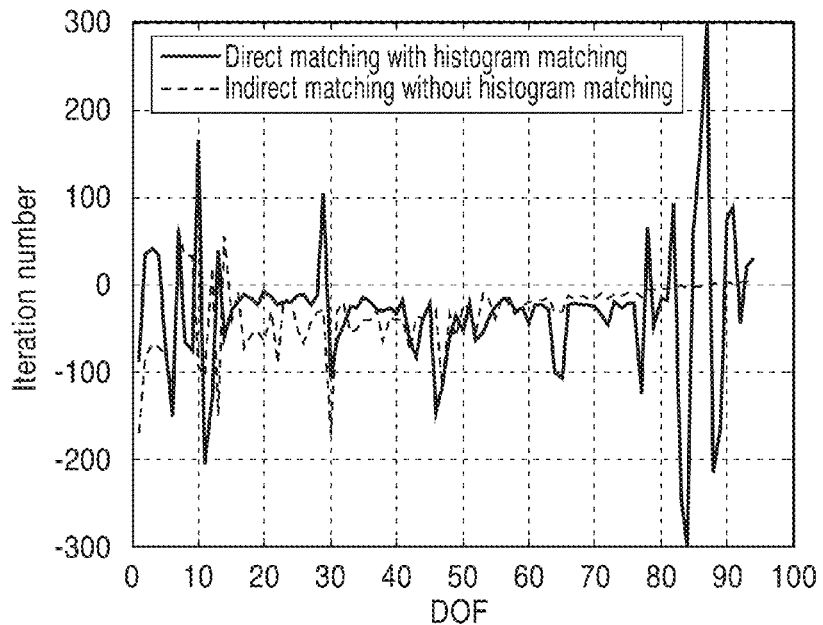
FIG. 12 is a plot of iteration number with respect to depth of field (DOF) for the "blowing tree" image according to the present disclosure.

FIG. 11A and FIG. 11B depict a sharpness measure and blur matching results for the blowing tree image. This result illustrates that it is necessary to select the best part from all three levels of the matching results in order to obtain a good combined matching curve as seen in FIG. 12. FIG. 11B shows that the $1^{st}$ level is more linear and less noisy when it is close to the focus position DOF 88. But the curve becomes worse, that is to say less linear and more noisy, when it is far away from the focus position Thus, the $1^{st}$ level should be utilized when it is close to focus position, while the higher levels are used when it is far away from the focus position.

FIG. 12 depicts iteration numbers for the blowing tree image in relation to DOF, for both direct and indirect matching. Again, one can see that indirect matching provides significantly improved results, in particular in view of the fact that the in focus position is around 88 DOF as seen in the plot, a region of the plot in which direct matching fluctuates wildly.

It should be recognized that direct matching breaks down in this motion situation because it relies on pixel correspondence between the two images. Indirect matching, however, still works quite well when the blur is within 20 DOF to the in-focus position. In very blurry situations, however, the indirect matching shows some matching noise, although it is still an improvement over direct matching.

Figure 13:
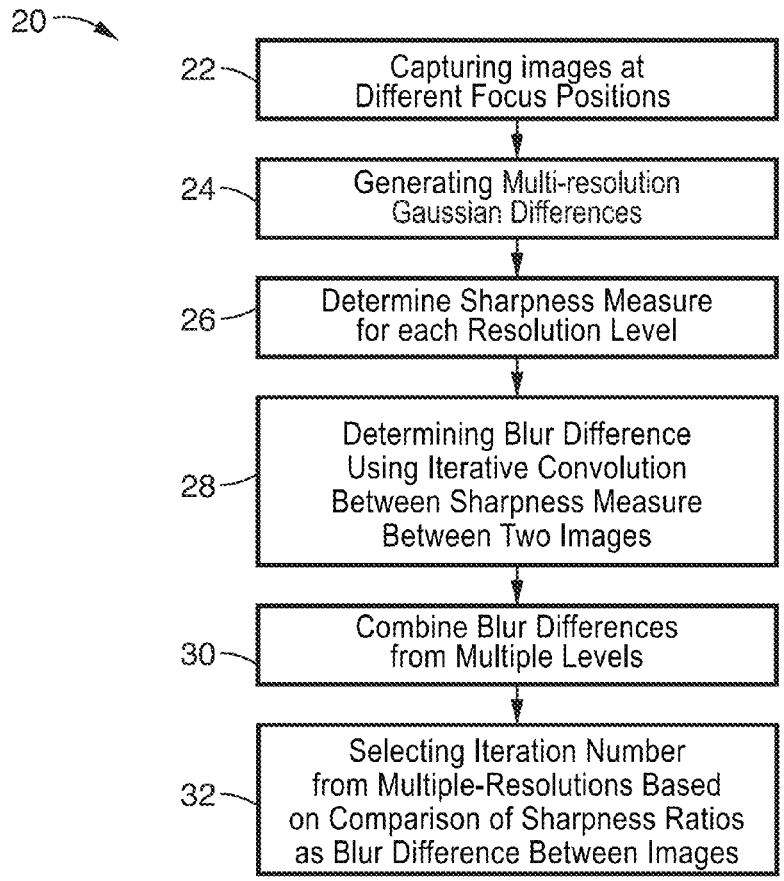
FIG. 13 is a flow diagram of determining blur difference utilizing the multi-resolution Gaussian blur differences according to an embodiment of the disclosed technology.

FIG. 13 illustrates an example embodiment 20 of determining blur difference in the present disclosure. Multiple images are captured 22 at different focus positions at the same location in relation to scene and at substantially the same time, so that for the most part difference between the images depends on the different focus. The captured images are sequential, in that the images are taken in close time sequence. However, it is not necessarily required that the images being compared are consecutive.

Multi-resolution Gaussian differences are determined 24. By way of example and not limitation, at least three different resolutions are preferably utilized for each image. In block 26, sharpness measure is calculated based on the Gaussian differences for each resolution level. In block 28, blur difference is determined using iterative convolution between sharpness measured between two images.

It should be appreciated that blur difference is determined in response to comparing blur difference estimation results with the following steps. Blur difference is determined (e.g., calculated) between two images for a single resolution level, and Gaussian differences $f-f_a$ and $f-f_b$. Sharpness measure $s(f)$ was described as being calculated using these two Gaussian differences. Blur difference $I_{A\_B}$ is determined based on the sharpness measure on two images $s(f_A)$ and $s(f_B)$. This blur difference calculation is applied on three levels.

Then these blur difference results, obtained from multiple levels (e.g., all three levels) using the iteration number selection method, are combined 30. An iteration number is then selected 32 based on a comparison of sharpness ratio as blur difference between the two images.

It should be appreciated that the blur difference determination described above is most typically applied for controlling focus in an image capturing device (e.g., camera, cellular phone, etc.).

It should be noted that for calibration, a whole sequence of images of step edges are captured at different lens DOF positions. The purpose is to get a curve, such as seen in FIG. 6, from which a depth estimation model is built. Then this model can be utilized for depth estimation for real scenes based on capturing only two images.

The matching curves of a step edge image can be approximated using a multi-dimensional polynomial function, such as a two-dimensional (2-D) polynomial function, to facilitate calculations while removing a large portion of mismatching noise. In this model, iteration number is a function of lens position and object distance. The coefficients are determined, for example in response to using a least squared error two-dimensional polynomial fitting algorithm. A two-dimensional polynomial can be utilized to model the blur iteration function:

$$I = \sum_{i=0}^{m} \sum_{j=0}^{n} C(i,j) L^i D^j$$

The coefficients $C(i, j)$ are determined using a least squares multidimensional polynomial fitting method. The degree of the polynomial, m and n, are chosen depending on the use of specific lenses and applications. Two examples are bi-quadratic (m=n=2) and bi-cubic (m=n=3) polynomials. By way of a first example, bi-quadratic function coefficients can be used to approximate the fitting algorithm. By way of example and not limitation, for a bi-quadratic approximation, the curves can be represented by a 3×3 matrix.

By way of a second example, bi-cubic function coefficients can be alternately utilized to approximate the fitting algorithm. By way of example and not limitation, for a bi-cubic approximation, the curves can be represented by a 4×4 matrix.

Using this model, depth estimation (subject distance) is readily implemented by capturing two images at different focal positions. It should be appreciated that although the example may indicate distance between the focus positions being one depth of field, this is by way of example and not limitation in regard the present disclosure. It will be noted that the subject distance (focal depth) is not known at the onset, as this is what is being estimated. The two pictures used in the process can be captured at any distances. Optionally, noise processing, may be performed on the captured image information prior to determination of blur difference. The blur difference between the captured images is calculated and the model becomes a single variable polynomial equation. The polynomial equation is solved for D, which results in generating an estimated depth of the object, also referred to as subject-distance. It should be noted that D can be configured in any desired format, such as an integer or floating point number. For auto focus applications, the lens can be moved to focus at the estimated distance D, and can estimate the new depth in the same manner. The procedure may be repeated until the iteration number converges to 0, or below some desired threshold. It should be appreciated that this method may be extended to higher dimensional polynomial models for varying focal lengths and apertures.

It should be appreciated, however, that since the matching curve for this multi-resolution Gaussian difference disclosure should be substantially linear, the above polynomial models may be reduced to a simple linear curve model. For example, utilizing a value of m=n=1 in the preceding polynomial equation yields the simpler linear model.

It should be appreciated that for depth estimation in real scenes, a whole sequence of images is not needed, only two pictures are required. The sequences of images were described in the preceding sections so that it could be shown that the matching curves for the real scenes also follow this model and this model can be utilized for depth estimation in real scenes.

Figure 14:
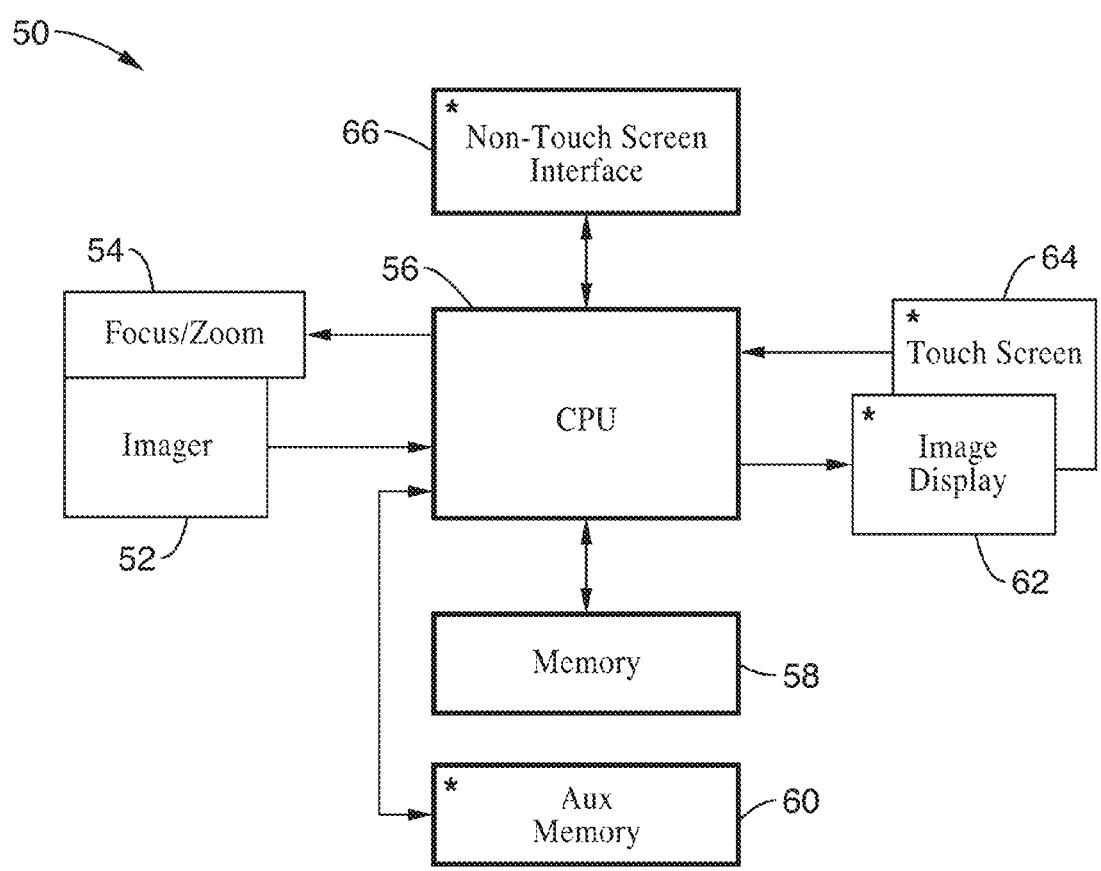
FIG. 14 is a block diagram of an image capture device, such as could be utilized according to an embodiment of the disclosed technology.

FIG. 14 illustrates an example embodiment 50 of an image capture device (e.g., camera system, camera-enable cell phone, etc.) which can be configured for performing the depth estimating utilizing the iterative convolutions of the multi-resolution Gaussian differences as described in this present disclosure. It will also be appreciated that the presented technology can be performed on a device separate from that which captures the image, although then information about the camera itself and its calibration model must be communicated to the other device. The elements depicted (50, 52, 54, 56) with an asterisk indicate camera elements which are optional in an image capture device utilizing the present technology. A focus/zoom control 54 is shown coupled to imaging optics 52 as controlled by a computer processor (e.g., one or more CPUs, microcontrollers, and/or DSPs) 56. In an image capture application, focus is adjusted based on the difference determinations performed across multiple levels, providing more accurate focus adjustment on the device. Computer processor 56 performs the depth estimation based on blur matching in response to instructions executed from memory 58 and/or optional auxiliary memory 60. Shown by way of example are an optional image display 62 and optional touch screen 64, as well as optional non-touch screen interface 66. The present disclosure is non-limiting with regard to memory and computer-readable media, insofar as these are non-transitory, and thus not constituting a transitory electronic signal.

Embodiments of the present disclosure may be described with reference to flowchart illustrations of methods and systems according to embodiments of the disclosure, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for estimating depth of focus in response to blur differences between captured images, comprising: (a) an image sensor configured for capturing digital images; (b) a focusing device coupled to said image sensor for controlling focal length of a digital image being captured; (c) a computer processor configured for performing image processing on images captured by said image sensor, and for outputting a signal for controlling focal length set by said focusing device; and (d) a memory storing programming executable by said computer processor for estimating depth of focus based on blur differences between images; and (e) said programming when executed performing steps comprising: (e)(i) receiving at least two sequential digital images at different focus settings; (e)(ii) generating Gaussian differences at multiple resolutions for each of said sequential object images utilizing blur kernels each with a given variance; (e)(iii) computing sharpness measure for each resolution level based on the Gaussian differences; (e)(iv) determining blur difference using iterative convolution to match sharpness measures between two images; and (e)(v) estimating subject distance in response to combining these blur differences, then selecting an iteration number from said multiple resolution levels based on comparing a ratio of sharpness measures as blur difference estimations between said digital images, and estimate subject distance from the estimated blur difference with a depth estimation model; and (e)(vi) outputting a signal to said focusing device for controlling focal length from said focusing device in response to said estimate of depth of focus.

2. The apparatus of any preceding embodiment, wherein said programming executable on said computer processor is configured for performing indirect blur difference matching utilizing a sharpness measure compared between two images, and not a direct blur difference which compares pixel values at corresponding locations of said two images.

3. The apparatus of any preceding embodiment, wherein said programming executable on said computer processor is configured for determining a sharpness measure for each of said multiple resolutions and comparing ratios between these sharpness measures for each convolution iteration to determine which iteration to select for a blur estimate.

4. The apparatus of any preceding embodiment, wherein said programming executable on said computer processor is configured for selecting an iteration is chosen for said blur estimate based on comparing said ratio of sharpness measures to a threshold value.

5. The apparatus of any preceding embodiment, wherein said programming executable on said computer processor is configured for utilizing different blur kernels at each of said multiple resolution levels in generating said Gaussian differences.

6. The apparatus of any preceding embodiment, wherein said programming executable on said computer processor is configured for reducing variance of said blur kernel as dimensions of images shrink.

7. The apparatus of any preceding embodiment, wherein said programming executable on said computer processor is configured for using higher image resolutions within said multiple resolutions to provide matching in near in-focus conditions, while lower image resolutions provide proper matching at increased levels of blur.

8. The apparatus of any preceding embodiment, wherein said programming executable on said computer processor is configured for determining said blur difference in estimating depth of focus for a given image capture device for which calibrated blur difference information is available in a depth estimation model.

9. The apparatus of any preceding embodiment, wherein said programming executable on said computer processor is configured for creating said depth estimation model by capturing a sequence of step edge images at different lens depth of field positions from which depth estimation model is built.

10. The apparatus of any preceding embodiment, wherein said programming executable on said computer processor is configured for building a depth estimation model as a linear or polynomial function.

11. The apparatus of any preceding embodiment, wherein said apparatus comprises an image capture device selected from a group of image capture devices consisting of camera systems, camera-enabled cell phones, or other image-capture enabled electronic devices.

12. The apparatus of any preceding embodiment, wherein said multiple resolution levels comprises three levels of resolution.

13. The apparatus of any preceding embodiment, wherein said multiple resolutions comprise a first resolution, then a second resolution, having a resolution in each dimension that is one-half of said first resolution, then a third resolution having a resolution in each dimension that is one-half of said second resolution.

14. The apparatus of any preceding embodiment, wherein said first resolution has a resolution in each dimension that is one-half of original image resolution.

15. The apparatus of any preceding embodiment, wherein said programming executable on said computer processor is configured for performing auto focusing in which said focus device coupled to said image sensor is adjusted based on estimated focus distance, and another image is captured, after which focus distance estimation is again performed with the new depth, and repeating this process until a desired convergence level of iteration number is achieved.

16. An apparatus for estimating depth of focus in response to blur differences between captured images, comprising: (a) an image sensor configured for capturing digital images; (b) a focusing device coupled to said image sensor for controlling focal length of a digital image being captured; (c) a computer processor configured for performing image processing on images captured by said image sensor, and for outputting a signal for controlling focal length set by said focusing device; and (d) a memory storing programming executable by said computer processor for estimating depth of focus based on blur differences between images; (e) said programming when executed performing steps comprising: (e)(i) receiving at least two sequential digital images at different focus settings; (e)(ii) generating Gaussian differences at multiple resolutions for each of said sequential object images utilizing blur kernels each with a given variance; (e)(iii) computing sharpness measure for each resolution level based on the Gaussian differences; (e)(iv) determining blur difference using iterative convolution to match sharpness measures between two images; (e)(v) estimating subject distance in response combining these blur differences, then selecting an iteration number from said multiple resolution levels based on comparing a ratio of sharpness measures as blur difference estimations between said digital images, and computing subject depth from the estimated blur difference using a depth estimation model; (e)(vi) wherein said ratio of sharpness measures is compared to a threshold value for each convolution iteration to determine which iteration to select for a blur estimate based; and (e)(vii) outputting a signal to said focusing device for controlling focal length from said focusing device in response to said estimate of depth of focus.

17. The apparatus of any preceding embodiment, wherein said programming executable on said computer processor is configured for performing indirect blur difference matching utilizing sharpness measures compared between images, and not a direct blur difference which compares pixel values at corresponding locations of said images.

18. The apparatus of any preceding embodiment, wherein said programming executable on said computer processor is configured for utilizing different blur kernels at each of said multiple resolution levels in generating said Gaussian differences.

19. The apparatus of any preceding embodiment, wherein said programming executable on said computer processor is configured for reducing variance of said blur kernel as dimensions of images shrink.

20. A method of focus control based on indirect blur comparisons between captured images, comprising: (a) receiving at least two object images at different focus settings within an electronic image capture device configured for performing image capture and processing; (b) generating Gaussian differences at multiple resolutions for each of said object images utilizing blur kernels each with a given variance; (c) computing sharpness measure for each resolution level based on the Gaussian differences; (d) determining blur difference using iterative convolution to match sharpness measures between two images; (e) estimating subject distance in response to indirect blur comparisons including determining blur difference on multiple resolution levels, combining these blur differences, then selecting an iteration number from said multiple resolution levels based on comparing a ratio of sharpness measures as blur difference estimations between said digital images, and compute subject depth from estimated blur difference using a depth estimation model; (f) wherein said indirect blur comparisons are based on comparing a sharpness measure images, and not a direct blur difference which compares pixel values at corresponding locations of said two images, and (g) controlling a focusing element of the electronic image capture device in response to said estimate of subject distance.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for estimating depth of focus in response to blur differences between captured images, comprising:
    (a) an image sensor configured for capturing digital images;
    (b) a focusing device coupled to said image sensor for controlling focal length of a digital image being captured;
    (c) a computer processor configured for performing image processing on images captured by said image sensor, and for outputting a signal for controlling focal length set by said focusing device; and
    (d) a memory storing programming executable by said computer processor for estimating depth of focus based on blur differences between images;
    (e) said programming when executed performing steps comprising:
        (i) receiving at least two sequential digital images at different focus settings;
        (ii) generating Gaussian differences at multiple resolutions for each of said sequential object images utilizing blur kernels each with a given variance;
        (iii) computing sharpness measure for each resolution level based on the Gaussian differences;
        (iv) determining blur difference for each image resolution using iterative convolution to match sharpness measures between two images;
        (v) estimating subject distance in response to combining these blur differences from each image resolution, then selecting an iteration number from said multiple resolution levels based on comparing a ratio of sharpness measures as blur difference estimations between said digital images, and estimate subject distance from the estimated blur difference with a depth estimation model; and
        (vi) outputting a signal to said focusing device for controlling focal length from said focusing device in response to said estimate of depth of focus.

2. The apparatus as recited in claim 1, wherein said programming executable on said computer processor is configured for performing indirect blur difference matching utilizing a sharpness measure compared between two images, and not a direct blur difference which compares pixel values at corresponding locations of said two images.

3. The apparatus as recited in claim 1, wherein said programming executable on said computer processor is configured for determining a sharpness measure for each of said multiple resolutions and comparing ratios between these sharpness measures for each convolution iteration to determine which iteration to select for a blur estimate.

4. The apparatus as recited in claim 3, wherein said programming executable on said computer processor is configured for selecting an iteration that is chosen for said blur estimate based on comparing said ratio of sharpness measures to a threshold value.

5. The apparatus as recited in claim 1, wherein said programming executable on said computer processor is configured for utilizing different blur kernels at each of said multiple resolution levels in generating said Gaussian differences.

6. The apparatus as recited in claim 5, wherein said programming executable on said computer processor is configured for reducing variance of said blur kernel as dimensions of images shrink.

7. The apparatus as recited in claim 1, wherein said programming executable on said computer processor is configured for using higher image resolutions within said multiple resolutions to provide matching in near in-focus conditions, while lower image resolutions provide proper matching at increased levels of blur.

8. The apparatus as recited in claim 1, wherein said programming executable on said computer processor is configured for determining said blur difference in estimating depth of focus for a given image capture device for which calibrated blur difference information is available in a depth estimation model.

9. The apparatus as recited in claim 8, wherein said programming executable on said computer processor is configured for creating said depth estimation model by capturing a sequence of step edge images at different lens depth of field positions from which depth estimation model is built.

10. The apparatus as recited in claim 8, wherein said programming executable on said computer processor is configured for building a depth estimation model as a linear or polynomial function.

11. The apparatus as recited in claim 1, wherein said apparatus comprises an image capture device selected from a group of image capture devices consisting of camera systems, camera-enabled cell phones, or other image-capture enabled electronic devices.

12. The apparatus as recited in claim 1, wherein said multiple resolution levels comprises three levels of resolution.

13. The apparatus as recited in claim 12, wherein said multiple resolutions comprise a first resolution, then a second resolution, having a resolution in each dimension that is one-half of said first resolution, then a third resolution having a resolution in each dimension that is one-half of said second resolution.

14. The apparatus as recited in claim 12, wherein said first resolution has a resolution in each dimension that is one-half of original image resolution.

15. The apparatus as recited in claim 1, wherein said programming executable on said computer processor is configured for performing auto focusing in which said focus device coupled to said image sensor is adjusted based on estimated focus distance, and another image is captured, after which focus distance estimation is again performed with the new depth, and repeating this process until a desired convergence level of iteration number is achieved.

16. An apparatus for estimating depth of focus in response to blur differences between captured images, comprising:
   (a) an image sensor configured for capturing digital images;
   (b) a focusing device coupled to said image sensor for controlling focal length of a digital image being captured;
   (c) a computer processor configured for performing image processing on images captured by said image sensor, and for outputting a signal for controlling focal length set by said focusing device; and
   (d) a memory storing programming executable by said computer processor for estimating depth of focus based on blur differences between images;
   (e) said programming when executed performing steps comprising:
      (i) receiving at least two sequential digital images at different focus settings;
      (ii) generating Gaussian differences at multiple resolutions for each of said sequential object images utilizing blur kernels each with a given variance;
      (iii) computing sharpness measure for each resolution level based on the Gaussian differences;
      (iv) determining blur difference for each image resolution using iterative convolution to match sharpness measures between two images;
      (v) estimating subject distance in response combining these blur differences from each image resolution, then selecting an iteration number from said multiple resolution levels based on comparing a ratio of sharpness measures as blur difference estimations between said digital images, and computing subject depth from the estimated blur difference using a depth estimation model;
      (vi) wherein said ratio of sharpness measures is compared to a threshold value for each convolution to determine which iteration to select for a blur estimate; and
      (vii) outputting a signal to said focusing device for controlling focal length from said focusing device in response to said estimate of depth of focus.

17. The apparatus as recited in claim 16, wherein said programming executable on said computer processor is configured for performing indirect blur difference matching utilizing sharpness measures compared between images, and not a direct blur difference which compares pixel values at corresponding locations of said images.

18. The apparatus as recited in claim 16, wherein said programming executable on said computer processor is configured for utilizing different blur kernels at each of said multiple resolution levels in generating said Gaussian differences.

19. The apparatus as recited in claim 18, wherein said programming executable on said computer processor is configured for reducing variance of said blur kernel as dimensions of images shrink.

20. A method of focus control based on indirect blur comparisons between captured images, comprising:
   (a) receiving at least two object images at different focus settings within an electronic image capture device configured for performing image capture and processing;
   (b) generating Gaussian differences at multiple resolutions for each of said object images utilizing blur kernels each with a given variance;
   (c) computing sharpness measure for each resolution level based on the Gaussian differences;
   (d) determining blur difference for each image resolution using iterative convolution to match sharpness measures between two images;
   (e) estimating subject distance in response to indirect blur comparisons including determining blur difference on multiple resolution levels, combining these blur differences, then selecting an iteration number from said multiple resolution levels based on comparing a ratio of sharpness measures as blur difference estimations between said digital images, and compute subject depth from estimated blur difference using a depth estimation model;
   (f) wherein said indirect blur comparisons are based on comparing a sharpness measure images, and not a direct blur difference which compares pixel values at corresponding locations of said two images, and
   (g) controlling a focusing element of the electronic image capture device in response to said estimate of subject distance.

* * * * *